Jan. 22, 1963  H. DICKINSON  3,074,274
TANK GAUGING SYSTEM
Filed May 21, 1959
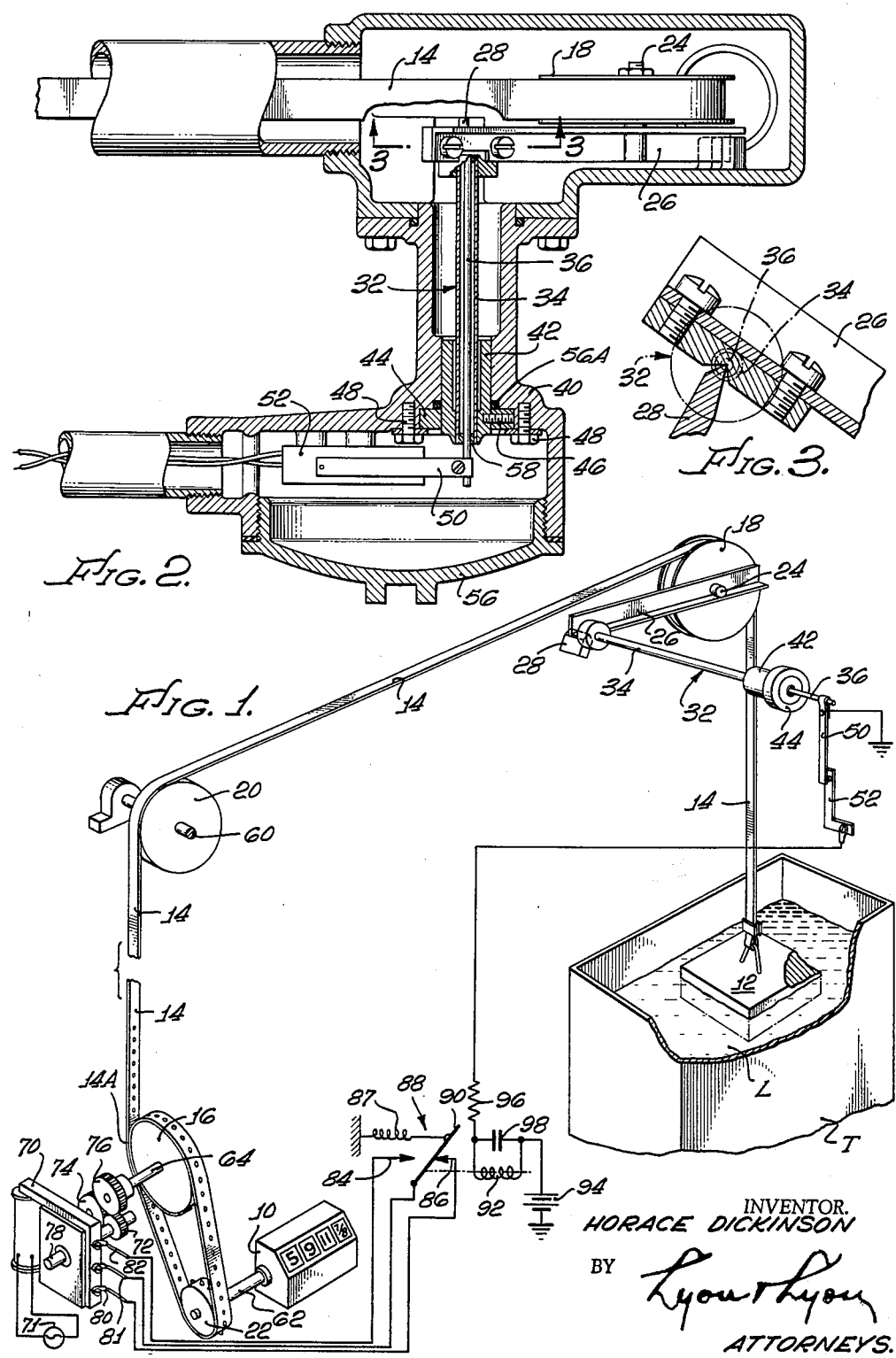
INVENTOR.
HORACE DICKINSON
BY
Lyon Lyon
ATTORNEYS.

3,074,274
Patented Jan. 22, 1963

3,074,274
TANK GAUGING SYSTEM
Horace Dickinson, South Gate, Calif., assignor to The Vapor Recovery Systems Co., Compton, Calif., a corporation of California
Filed May 21, 1959, Ser. No. 814,770
11 Claims. (Cl. 73—309)

The present invention relates to improved means and techniques for measuring or indicating the position of an element and has particular utility in the measurements or indication of a liquid level in a petroleum storage tank.

Briefly, the system described herein involves the use of a solid liquid level sensing plate which does not displace enough liquid to float it. Consequently, a portion of the weight of the sensing plate termed the "unbalanced weight" must be supported. This "unbalanced weight" is effectively measured and deviations from a predetermined value thereof, i.e. from a particular level with respect to the actual liquid level, produce changes in the position of the sensing plate, such changes being indicated on a suitable indicator. Indeed, one important feature of the present invention is that periodically the sensing plate is moved into the liquid and is then periodically withdrawn past that level corresponding to the point where such predetermined "unbalanced weight" exists. Consequently, in operation of the system, the liquid level sensing plate and tape system attached thereto oscillates about a means position overcoming static frictional forces which otherwise might produce erroneous results; and of great importance also is that such oscillations indicated also on the level indicator serve to appraise an observer of continued operation of the system.

An object of the present invention is to provide improved means and techniques for accomplishing the above indicated results.

A specific object of the present invention is to provide a system of this character which overcomes the effect of friction by establishing an oscillatory condition of a sensing element which oscillates about a mean or average condition, thereby providing a system in which the accuracy is not affected by friction.

Another specific object of the present invention is to provide a system of this character which, by simple visual inspection of a position indicator, allows one to determine whether or not the system remains in an operative condition.

Another specific object of the present invention is to provide a novel liquid level indicating system which does not necessitate the use of a float with all of its attendant disadvantages arising, for example, when such buoyant float develops a leak.

Another object of the present invention is to provide an improved system of this character which is accurate notwithstanding its simplicity and ease of manufacture and assembly.

Another object of the present invention is to provide a power-operated tank gauge which detects the change in liquid level without depending upon energy derived from the liquid level itself, as is the case when a float is used, and also one in which the accuracy is affected in relatively small degree by changes in specific gravity or density of the liquid.

Another object of the present invention is to provide an improved system of this character in which an observer is readily appraised of a condition wherein either the liquid level sensing element is suspended above the level or is submerged too far below the liquid level.

Another object of the present invention is to provide an improved system of this character in which the sensing of the load imposed by the net weight of the sensing element is accomplished at a point close to the sensing element, thereby contributing materially to the accuracy of the system.

Another object of the present invention is to provide a system of this character which incorporates means for automatically compensating for changes in weight of the tape when and as the liquid level changes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a system embodying features of the present invention.

FIGURE 2 illustrates more structural features of the mechanism for sensing the unbalanced weight of the liquid level sensing element.

FIGURE 3 is a sectional view taken substantially on line 3—3 of FIGURE 2.

Referring to FIGURE 1, the liquid level of liquid L in tank T is indicated on a gauge 10 which may be in the form of a revolution or Veeder-Root counter.

The liquid level, in general, is sensed in terms of liquid displaced by a flat solid plate 12 of material which is more dense than the liquid L. This means that unless the sensing plate 12 is supported, it will sink to the bottom of the tank T. The force required to support this plate 12 with only a predetermined portion thereof submerged in the liquid is termed the "unbalanced force." This force is, of course, a tension force exerted through the steel tape 14 which has one of its ends attached to the plate 12 and the other one of its ends fastened to a peripheral portion of the storage sheave 16. The tape 14, which is perforated uniformly along substantially its entire length, thus extends, in turn, from the sensing plate 12, over the idler sheaves 18 and 20, over the sprocket sheave 22 to the storage sheave 16. An intermediate portion of the tape 14 between sheaves 20 and 22 contacts or rubs against the tape reeled on storage sheave 16 for providing a compensatory effect as described later.

The idler sheave 18 is rotatably mounted on a shaft 24 which is affixed on a torque arm 26. The torque arm 26 (FIGURES 1 and 3) is fulcrumed as a lever about the stationary pivot 28 and thus tends to be rotated or pivoted by tape 14 in a clockwise direction in FIGURES 1 and 3 about the fixed fulcrum 28; but this tendency to pivot is resisted by a torque tube assembly 32.

This assembly 32, in general, is of conventional construction and involves an outer tube 34 and a coaxial inner rod 36. One of the adjacent ends of tube 34 and rod 36 is secured to the torque arm 26 with the axis of rod 36 corresponding to the pivotal axis of arm 26. The other end of tube 34 is stationarily supported in the stationary housing 40; and for this latter purpose the tube 34 has secured thereto sleeve 42 and collar 44, all of which are rigidly maintained by set screw 46 and clamps 48, the sleeve 42 being secured to the tube 34 in the torque tube assembly 32.

The other end of the rod 36 which extends through the tube 34 has secured thereto an electrical switch arm 50 that cooperates with the other stationary switch arm 52 for performing a control function as described later.

It will be clear from the foregoing description that pivotal movement of the torque arm 26 is resisted by the torque tube 34 which is twisted slightly about its axis and that such assumed pivotal movement of arm 26 results in corresponding rotation of the rod 36 about its axis to move the switch arm 50 a corresponding amount with respect to the stationary contact 52.

The housing 40 in FIGURE 2 is closed by a removable screw-threaded cover 56 through which access is had to the switch contacts 50, 52 for servicing and replacement. This particular assembly shown in FIGURE 2 is of particular importance since the switch 50, 52 is in a closed housing where combustible mixtures may not enter and result in explosion by an electrical sprak or arc produced by such switch. If desired, an O-ring seal 56A as shown may be squeezed between the collar 44 and housing 40 to assure a seal, but this problem of providing a closed leak-proof switch chamber is facilitated by the fact that the end of the torque tube assembly is stationary at that point. If desired, a loosely fitting seal 58 may be placed between the stationary end of tube 34 and the movable end of rod 36.

While the sheave 18 thus rotates about a "floating" axis, i.e. the axis of shaft 24, the sheave 20 rotates about the fixed axis of shaft 60, the tape driving sprocket 22 is rotated about the fixed axis of shaft 62, and the storage sheave is rotated about the fixed axis of shaft 64.

The shaft 64 is driven by the A.C. motor 70 through a speed reduction unit exemplified here by the three gears 72, 74 and 76, the gear 72 being mounted on the motor shaft 78, the gear 74 being an intermediate gear and gear 76 being on shaft 64.

Means are provided for periodically reversing the direction of motor shaft rotation and hence the direction of travel of tape 14. These means involve a conventional three-terminal winding on the motor 70 represented by the three terminals 80, 81 and 82. The two outside terminals 80 and 82 are connected to corresponding stationary contacts 84 and 86 of a single pole double throw relay switch 88 having its movable switch arm 90 connected to the intermediate terminal 81. The switch arm is controlled by the relay winding 92 which has one of its terminals connected to one terminal of source 94 and the other one of its terminals connected through resistance 96 to stationary switch contact 52. It is noted that the other terminal of source 94 and movable switch arm 50 are both grounded so that when switch 50, 52 is closed, the relay winding 92 is energized through resistance 96 to actuate switch 88. In normal operation of the system this relay winding 92 is periodically energized and de-energized, and its energization is controlled by the series-connected resistance 96 and condenser 98 connected in shunt therewith. This resistance 96 and condenser 98 provide a time constant to control the period of operation of relay switch 88.

The contacts 50 and 52 are closed for a time sufficiently long to allow sufficient voltage to be developed across condenser 98, after which time the relay switch arm 90 is moved against the bias of spring 87 to its actuated condition shown in FIGURE 1 where it engages the stationary contact 86. The amount of time delay between closure of switch 50 and 52 is established by the values of resistance 96 and condenser 98 as is well understood in the art.

When relay switch 86, 90 is thus closed, the motor 70, which is constantly energized from the A.C. source 71, has its shaft rotating in such direction as to reel tape onto the storage sheave 16, i.e. the tape and sensing element 12 are driven upwardly where the liquid L in tank T then exerts a lesser buoyant force on the sensing element 12. This results in more torque applied to the torque arm 26 which then, together with the torque tube rod 36, pivots in a clockwise direction (FIGURES 1 and 3) about the fixed fulcrum 28 to open the switch 50, 52. After switch 50, 52 is thus opened and the condenser 98 is sufficiently discharged, the switch arm 90 is returned by spring 87 to its normal position in engagement with stationary contact 84 to thereby produce a reversal of rotation of motor shaft 78 and consequent unreeling of the tape from storage spool 16.

Thus, in this condition the dense sensing element 12 becomes more and more submerged and the buoyant forces thereon increase with the result that less torque is exerted on the torque arm 28. This means that the arm 26 and rod 36 pivot or rotate in a counterclockwise direction in FIGURE 1 to again close switch 50, 52 to again energize the relay winding 92 sufficiently after some time delay established by the values of resistance 96 and condenser 98. This process thus continues with the net result that there is actually no null point but the system continuously seeks or "hunts" such a null point. In other words, an oscillatory condition is purposely established, even when, as assumed above, the level of the liquid remains constant. This oscillatory condition may be visually observed by observing the changing readings on the gauge 10 which in and of itself is an indication that the system is operating properly. This range or amplitude of oscillations need not be very large and is at a relatively slow rate so that the readings on gauge 10 may be observed at any one particular time; and even though such readings continuously vary, the actual liquid level is determined by taking the average of the two extreme readings, i.e. maximum "up" reading and maximum "down" reading.

The operation of the system may be summarized as follows. Assuming a constant liquid level, the switch 50, 52 alternately opens and closes causing the level indicator reading on indicator 10 to oscillate slightly. The electrical circuitry is so arranged that with the switch 50, 52 open, the motor 70 drives the element 12 downwardly, and with the switch 50, 52 closed, the motor 70 drives the element 12 upwardly.

As the liquid immerses the element or displacer 12 (increasing liquid level), force is decreased by increase of displacer buoyancy. This decreased force acting on the torque arm 26 causes the torque tube rod 36 to turn to close switch 50, 52. The electric motor shaft 78 then rotates to move the displacer 12 in the "up" direction, thereby turning sprocket sheave 22 and level indicator 10. The motor 70 continues to rotate in the same direction, i.e. to move the displacer 12 up until the system adjust itself to the new liquid level.

As the liquid falls away from the displacer 12 (decreasing liquid level), the force on the sheave 18 or torque arm 26 is increased by the decrease of displacer buoyancy. This increased force turns the torque tube rod 36 to open switch 50, 52 to cause the motor shaft 78 to rotate in the "down" direction, allowing weight of displacer 12 to turn the sprocket sheave 22 and to position numerals of the level indicator 10 which, incidentally, in FIGURE 1 indicates fifty-nine (59) feet, eleven and seven-eighths (11⅞) inches. The motor shaft continues to be driven in the "down" direction until the system adjusts itself to the new liquid level.

Compensation is automatically made for the weight of that section of tape 14 between sheave 18 and displacer 12. This particular section, of course, varies with variations in position of the displacer 12 and its weight also influences the degree to which the displacer 12 is submerged. In other words, the net weight of this tape section decreases as the liquid level increases. This particular condition causes the liquid line on the displacer (at an assumed balanced point) to vary according to the liquid level. Compensation for the varying net weight of tape 14 between sheave 18 and displacer 12 is accomplished by positioning the storage sheave 16 and sprocket sheave 12, as shown in FIGURE 1, such that when and as the tape builds up in diameter on the storage sheave 16, an intermediate portion of the tape indicated at 14A is deflected further and further to the left in FIGURE 1 to achieve the effect of a shortened tape length between displacer 12 and the sprocket sheave 22. This compensation is such that the indicator 10 always reads the correct position of displacer 12.

While the particular embodiments of the present invention have been shown and described, it will be obvious to those skilled in the art that changes and modifications may be made without departing from this invention in

I claim:

1. In a liquid level measuring system, a partially submerged sensing element movable with respect to the level of said liquid and having a density greater than the density of said liquid, means continuously producing an oscillatory condition of said element in a continuously partially submerged condition in said liquid and with respect to said liquid level over the entire range of liquid level measurements, and means indicating the oscillatory condition of said element.

2. In a system for indicating the level of liquid, a liquid displacing element of density greater than said liquid, a tape supporting said element, a sheave, a pivoted arm rotatably supporting said sheave, said tape passing over said sheave to support said element in said liquid in a partially submerged condition in said liquid, a torque tube resisting movement of said arm and having an element thereof movable in accordance with said arm, motor-operated means for moving said tape in alternate directions, and means operated by the last mentioned element for periodically reversing said motor-operated means to alternately move said tape in opposite directions.

3. In a liquid level measuring system, a partially submerged sensing element of density greater than the density of the liquid whose level is indicated, force exerting means acting on said element to maintain the same in a partially submerged condition, said force exerting means comprising means responsive to the unbalanced forces on said element for maintaining the same in a partially submerged condition.

4. In a liquid level measuring sysem, an element partially submerged in the liquid and movable with respect to said liquid level, means sensitive to the relative position of said element with respect to said liquid level for maintaining an oscillatory condition of said element, and means indicating said oscillatory condition.

5. In a liquid level indicating system, a liquid displacing element maintained in a partially submerged condition in said liquid and having a density greater than the density of said liquid, force exerting means acting on said element and supporting said element in a continuously oscillating condition while being at all times in said partially submerged condition over the entire range of liquid level indications, means movable in response to the force required to maintain said element in said condition, and liquid level indicating means controlled by the last mentioned means.

6. In a liquid level indicating arrangement, a liquid level displacing element maintained in a partially submerged condition in said liquid and having a density greater than the density of said liquid whereby the same tends to sink in such liquid; a tape-sheave system supporting said element in said condition; said system comprising: a first sheave; a second sheave; and a tape storage sheave; a tape having one of its ends attached to said element and passing over, in turn, said first sheave, said second sheave and said storage sheave; a pivoted arm; means rotatably supporting said first sheave on said arm; said first sheave supporting substantially all of the unbalanced weight of said element and that portion of the tape between said element and said first sheave; resilient means resisting pivotal movement of said arm; switch means operated in accordance with pivotal movement of said arm; motor-operated means for alternately rotating said storage sheave to reel and unreel the tape therefrom; means incorporating said switch means for controlling said motor-operated means; and means operated by said tape for indicating the position of said element.

7. An arrangement as set forth in claim 6 in which said indicating means comprises a sprocket sheave engaging perforations in said tape in travel of said tape from said second sheave to said storage sheave with intermediate portions of said tape between said sprocket sheave and said second sheave rubbing against tape stored on said storage sheave to effectively shorten said tape when said element is raised with respect to the liquid level.

8. In a liquid level measuring system, a liquid displacing element of density greater than said liquid and maintained in a partially submerged condition in said liquid, movable force exerting means acting on said element to maintain the same in said condition, means for moving said element up and down in said liquid, and means responsive to the position of said movable means for controlling said moving means.

9. In a liquid level measuring system, a liquid displacer of density greater than the density of the liquid and normally maintained in a partially submerged condition in the liquid, means for moving said element further in and further out of said liquid, and means responsive to the unbalanced weight of said element for controlling said moving means.

10. A system as set forth in claim 9 in which the last mentioned means comprises a torque tube, a switch operated by the torque tube, and said switch controlling said moving means.

11. A system as set forth in claim 10 in which indicating means is operated by said moving means.

References Cited in the file of this patent

UNITED STATES PATENTS

| | | |
|---|---|---|
| 1,723,173 | Huggins | Aug. 6, 1929 |
| 1,760,204 | Mittendorf | May 27, 1930 |
| 2,557,488 | White | June 19, 1951 |
| 2,627,660 | Smith | Feb. 10, 1953 |
| 2,698,539 | Gridel | Jan. 4, 1955 |
| 2,698,544 | Hansen | Jan. 4, 1955 |
| 2,899,751 | Mayes | Aug. 18, 1959 |
| 2,952,155 | Koehne | Sept. 13, 1960 |

FOREIGN PATENTS

| | | |
|---|---|---|
| 343,744 | Germany | Nov. 8, 1921 |